United States Patent [19]

Schard

[11] 4,235,487
[45] Nov. 25, 1980

[54] ROLLING BEARING CAGE

[75] Inventor: Lothar Schard, Stuttgart, Fed. Rep. of Germany

[73] Assignee: SKF Industries, Inc., King of Prussia, Pa.

[21] Appl. No.: 949,514

[22] Filed: Oct. 10, 1978

[30] Foreign Application Priority Data

Oct. 18, 1977 [DE] Fed. Rep. of Germany ... 7732101[U]

[51] Int. Cl.$^3$ ................... F16C 19/20; F16C 33/46
[52] U.S. Cl. ................................ 308/217; 308/201
[58] Field of Search .................. 308/217–218, 308/201, 235

[56] References Cited

U.S. PATENT DOCUMENTS

| 3,144,284 | 8/1964 | Ortegren | 308/217 |
| 3,365,775 | 1/1968 | Cavagnero et al. | 308/217 X |
| 3,368,854 | 2/1968 | Adams | 308/201 |
| 3,388,952 | 6/1968 | Schaeffler | 308/217 |
| 3,399,008 | 8/1968 | Farrell et al. | 308/217 |

Primary Examiner—Douglas C. Butler
Attorney, Agent, or Firm—Eugene E. Renz, Jr.

[57] ABSTRACT

A rolling bearing cage made of an elastic material comprising an annular member having a plurality of circumferentially spaced pockets for rolling elements, confronting terminal end portions, at least one shoulder projecting in a peripheral direction from at least one of the terminal end portions adapted to engage the opposing terminal end portion under pre-tension, at least one recess in at least one of the terminal end portions adjacent the shoulder and extending inwardly from the side edge of the annular member so that the lug member functions in the nature of a leaf spring having limited pivotal movement in a peripheral direction. In this fashion the cage has elastic resilience within a relatively wide range in a peripheral direction without unduly overstressing the cage material.

5 Claims, 2 Drawing Figures

ROLLING BEARING CAGE

BACKGROUND OF THE INVENTION

The present invention relates to rolling bearing cages and more specifically to cages made of an elastic material having a structure providing for a predetermined amount of elastic resilience to prevent harmful stress of the cage material as the result of dimensional changes caused by fabrication tolerances or heat expansion.

Rolling bearing cages having elastic resilience are not new per se. In accordance with a prior cage, one of the two abutting end faces of the cage has a laterally closed recess providing a certain amount of elasticity in a peripheral direction. This end face preferably has a shoulder in the vicinity of the laterally closed recess which projects in a peripheral direction and engages the opposing end face under a certain amount of pre-tension. By this arrangement, the cage has the capability of springing radially outward in the direction of the bore of the outside ring of the bearing or the bore of the housing so that the play of the roller bearing cage and/or the rolling elements in the cage pockets is eliminated. Consequently the formation of a harmful ridge in bearing races is avoided which can occur when the bearing is temporarily in a stationary position. Formation of these ridges is commonly called "false brinelling" which may be defined as localized fretting, arising when rolling elements of a bearing oscillate with small amplitude while pressed against a race surface, as in a stationary bearing subjected to vibrations.

It has been found, however, that there are certain drawbacks and disadvantages in a cage of this type. For example, the elastic resilience provided by the closed recess is comparatively small especially in narrow roller bearing cages with the attendant result that a harmful excess stress of the cage material can be produced by dimensional changes of the rolling bearing due to fabrication tolerances or heat expansion produced by elevated temperatures under operating conditions.

With the foregoing in mind, it is an object of the present invention to provide an improved rolling bearing cage of the above type which prevents ridge formation or "false brinelling" and wherein the elastic end faces have a relatively large amount of spring in a peripheral direction. It is also an object to provide a roller bearing cage of this type which can be produced economically and efficiently.

SUMMARY OF THE INVENTION

The rolling bearing cage according to the present invention is a split annular member having terminal end portions with confronting axial end faces. In the present instance at least one of the two confronting axial end faces is provided with a shoulder at both ends which projects in a peripheral direction and engages the opposing end face under a certain amount of pre-tension. Further, at least one of the two axial end faces has a recess in the vicinity of each shoulder starting from the side edge of the cage and extending inwardly toward the center line thereof. The lateral sections of the end faces thus formed are stressed in bending in much the same manner as a single-sided fixed leaf spring and provide therefore elastic resilience within a relatively wide range in a peripheral direction without unduly overstressing the cage material.

In accordance with a specific feature of the invention, a tongue or tab projects from one of the two opposing axial end portions of the cage which projects in a peripheral direction and engages in a slot in the opposing end face. The tongue and slot are aligned in the axial center of the cage. By this arrangement the adverse axial displacement or shifting of the opposing end faces is eliminated, the harmful axial vibrations of the slotted ends of the roller bearing cage are prevented and a good alignment of the opposing end faces is assured by the tab and slot arrangement. In the preferred form of the invention, each axial end face has projecting shoulders which confront and engage. Even though the rolling bearing cage may be fabricated of many suitable materials, it has been found that for economy reasons a plastic reinforced with fiberglass is a suitable material.

BRIEF DESCRIPTION OF THE DRAWING

These and other objects of the present invention and the various details of the operation and construction thereof are hereinafter more fully set forth with reference to the accompanying drawing, wherein.

DESCRIPTION OF A PREFERRED EMBODIMENT

Figure 1:
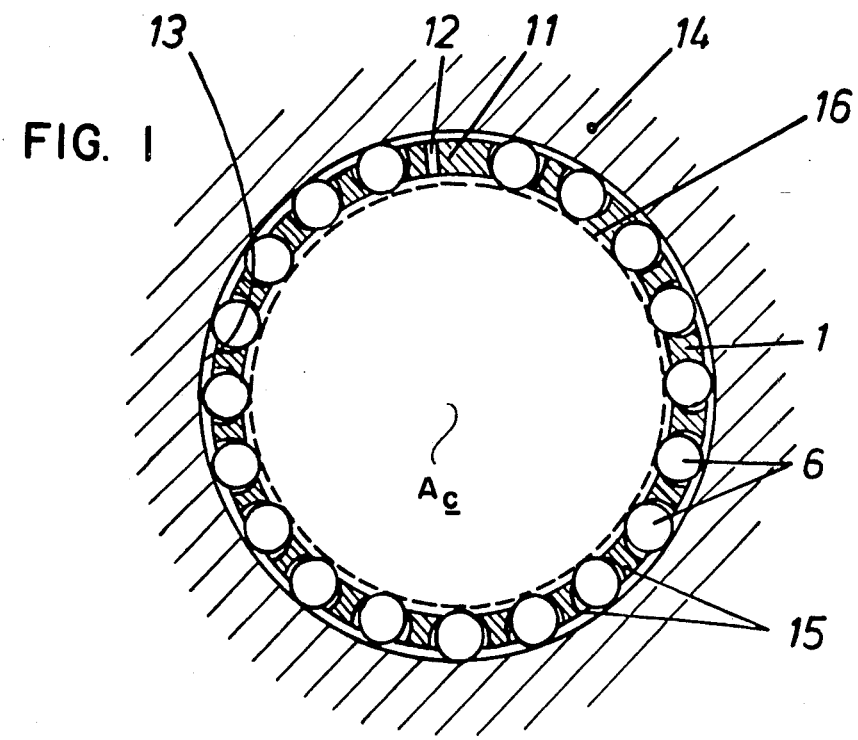
FIG. 1 is a transverse sectional view of a roller bearing cage constructed in accordance with the present invention taken on lines A—A of FIG. 2.

Referring now to the drawing there is illustrated a rolling bearing cage constructed in accordance with the present invention. The cage which is generally designated by the numeral 1 is a one-piece strip formed into an annular shape having an axially extending slot 2 formed by the spaced opposing axial end faces 3 and 4. As is conventional the roller bearing cage 1 has a plurality of circumferentially spaced axially extending pockets 5 for a plurality of rollers 6.

Figure 2:
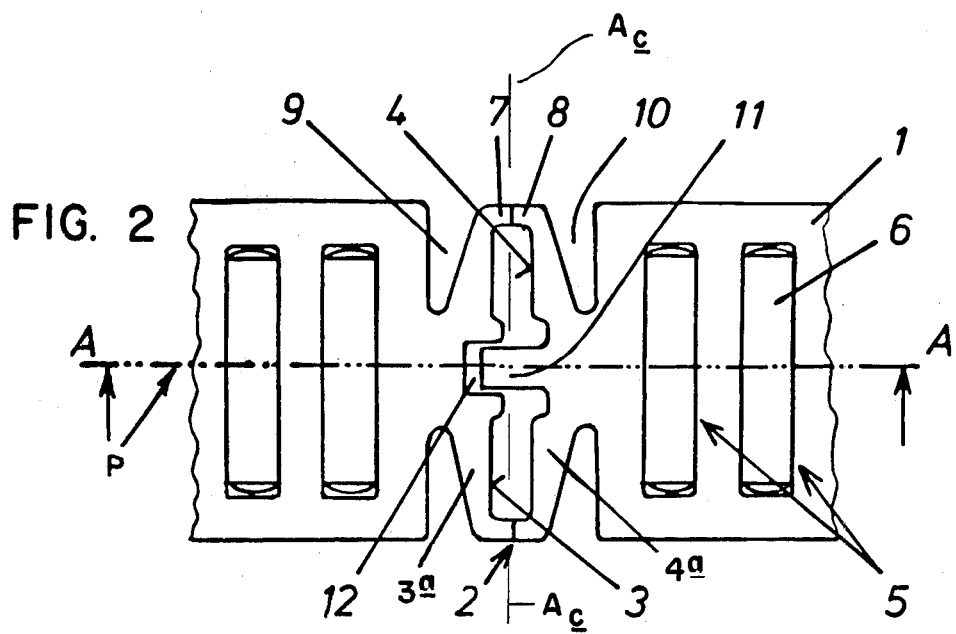
FIG. 2 shows an enlarged fragmentary plan view of the cage.

In accordance with the present invention, the terminal end portions 3a, 4a of the cage are formed to provide a degree of resilience or spring in a peripheral direction and to this end the axial end faces 3 and 4 are provided with shoulder or lug extensions 7 and 8 respectively adjacent the outer side edges which project in a circumferential or peripheral direction and engage one another in the manner shown in FIG. 2 under a predetermined pre-tension. In this manner, the axial end faces 3 and 4 are circumferentially spaced apart in the manner illustrated in FIG. 2. As illustrated, the shoulders or lugs 7, 8 on each axial end face are aligned so that they confront and engage one another in the manner shown. Each terminal end portion of the cage is provided with a slot or recess extending inwardly from the outer side edge toward the central plane of the cage. These slots or gaps are designated by the numerals 9 and 10 in the terminal end portions 3a and 4a respectively. In the present instance, the configuration of the terminal end portions 3a, 4a of the cage are symmetrical about a plane P transverse to the central axis $A_c$ of the cage and spaced midway between the outer circumferential side edges of the cage. Further, as shown, the slots 9 and 10 are generally triangularly shaped and extend inwardly from the side edges with the apex of the slot spaced from the plane P. The cage includes a tab or tongue 11 projecting on a circumferential direction from the terminal end portion 4a which engages in a slot or pocket 12 conforming and complementing the shape of the tab 11 in the opposing terminal end portion 3a.

When the cage is in place as illustrated in FIG. 1, installed in the bore 13 of an outer ring or a housing which serves as the outer race for the rollers 6, the opposing lugs or shoulders 7 and 8 abut one another under a predetermined tension since the lateral sections of the terminal end portions defined by the slots 9 and 10 function like single-sided fixed leaf springs which are elastically resilient in a circumferential or peripheral direction.

The rolling bearing cage 1 which is preferably made of an elastic material such as a fiberglass reinforced plastic is accordingly placed under tension in a circumferential direction during installation and pressed under a soft outward spring pressure in the direction of the bore 13 of the housing 14. In this position, the engagement of the lip or tongue 11 in the complementary slot 12 locks the terminal end portions 3a and 4a against displacement in an axial direction thereby preventing harmful adverse vibrations.

As illustrated in FIG. 1, the surfaces or walls 15 defining the cage pockets 5 converge inwardly in a radial direction so that the width of each cage pocket is smaller at the inner peripheral face of the cage than at the outer peripheral face and it is also smaller than the diameter of the rollers 6 thus retaining the rollers in the cage pockets against displacement out of the cage when the shaft 16 is removed. The play of the roller 6 in the cage pockets 5 is eliminated when the lugs or shoulders 7 and 8 are pressed against one another and a peripheral pre-tension of the cage takes place during installation of the rolling bearing cage in the manner described above. The rolling bearing cage 1 springs mainly radially outward and urges the rollers 6 and elastically presses them against the bore 13 of the housing 14.

In summary, therefore, the rolling bearing cage of the present invention provides several distinct advantages over prior cages in that the configuration of the terminal end portions provide a relatively wide spring elasticity in a peripheral direction. Moreover, the terminal end portion configuration is of relatively simplified design so that the cage can be fabricated in an economic manner.

Even though a specific embodiment has been illustrated and described herein, it is not intended to limit the invention and changes and modifications may be made therein within the scope of the following claims. For example, even though a clearance between the cage and bore is shown, the cage which springs radially outwardly can contact the bore directly thereby preventing the formation of harmful troughs or ridges when the roller bearing is temporarily at rest. In this instance, the distance of the guide surfaces defining the cage pockets are not diminished in a radial direction inwardly so that the radial shifting of the roller bearing cage is not inhibited by the rollers in the cage pockets. Additionally the rolling bearing cage can also be installed in the bore of the bearing ring which carries the outer race of a rolling bearing. Further even though the bearing illustrated employs cylindrical rollers, the rolling bearing cage has useful application in other types of bearing assemblies wherein the rollers are, for example, spherical.

What is claimed is:

1. A cage for a rolling bearing made of a resilient material comprising an elongated strip member having terminal end portions adapted to be formed to an annular shape wherein the terminal end portions abut, a plurality of spaced pockets in the strip member for rolling elements, each terminal end portion of said strip member including a pair of lug members defined by a recess which extends inwardly from opposite sides of said strip to a point adjacent the center plane of the strip member defining a hinge connection for each lug member so that each lug member functions like a spring and has limited pivotal movement in a peripheral direction, a leg extension projecting circumferentially from the outer free end of each lug member outboard of the center plane, the leg extensions of the lug members at one terminal end portion of said strip member aligned with and abutting the leg extensions of the other terminal end portion so that the axial end faces of the lug members are circumferentially spaced apart.

2. A cage for a rolling bearing made of a resilient material comprising an elongated strip member having terminal end portions adapted to be formed to an annular strip wherein the terminal end portions abut, a plurality of spaced pockets for rolling elements, at least one of the terminal end portions including a pivotal lug member formed by at least one recess extending inwardly from the side edge of the strip member adjacent the terminal end portion which functions like a single-sided fixed leaf spring and is elastically resilient in a circumferential direction.

3. A cage as claimed in claim 2 including a tab projecting in a peripheral direction from one of said terminal end portions engageable in a slot in the opposing terminal end portion to retain the end portions against lateral movement.

4. A cage as claimed in claim 2 made of plastic material.

5. A cage for a rolling bearing made of a resilient material comprising an elongated strip member having terminal end portions adapted to be formed to an annular shape wherein the terminal end portions abut, a plurality of spaced pockets for rolling elements, at least one terminal end portion of said strip including a pair of lug members formed by recesses extending inwardly from opposite side edges of the strip member to a point adjacent the center plane thereof, each lug including a leg extension projecting circumferentially to abut the opposite terminal end portion thereby to function like single-sided leaf springs which are elastically resilient in a circumferential direction.

* * * * *